(12) United States Patent
Vermeersch et al.

(10) Patent No.: US 11,846,349 B2
(45) Date of Patent: Dec. 19, 2023

(54) BRAKE TRANSMISSION SHIFT INTERLOCK ASSEMBLY

(71) Applicant: STEERING SOLUTIONS IP HOLDING CORPORATION, Saginaw, MI (US)

(72) Inventors: Michael C. Vermeersch, Flushing, MI (US); Christopher F. Watz, Bay City, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 947 days.

(21) Appl. No.: 16/376,017

(22) Filed: Apr. 5, 2019

(65) Prior Publication Data

US 2020/0318732 A1 Oct. 8, 2020

(51) Int. Cl.
*F16H 61/22* (2006.01)
*F16H 59/54* (2006.01)

(52) U.S. Cl.
CPC ............. *F16H 61/22* (2013.01); *F16H 59/54* (2013.01); *F16H 2061/223* (2013.01)

(58) Field of Classification Search
CPC .... F16H 59/54; F16H 61/22; F16H 2061/223; H01F 2007/086; H01F 7/16; H01F 7/1607
USPC .................................. 335/257, 261, 262, 264
See application file for complete search history.

(56) References Cited

U.S. PATENT DOCUMENTS

| | | | | | |
|---|---|---|---|---|---|
| 4,490,057 | A | * | 12/1984 | Reece | ..................... B41J 2/285 400/167 |
| 4,947,968 | A | * | 8/1990 | Slavin | ..................... F16H 61/22 192/220.4 |
| 4,987,968 | A | * | 1/1991 | Martus | ..................... F16C 1/12 180/271 |
| 5,176,231 | A | * | 1/1993 | Moody | ................... F16H 61/22 192/220.2 |
| 5,489,246 | A | * | 2/1996 | Moody | ................... F16H 59/10 192/220.2 |
| 6,720,853 | B1 | * | 4/2004 | Callis | .................. F16K 31/0644 335/258 |
| 6,823,757 | B2 | * | 11/2004 | Kobayashi | ............ H01F 7/1607 335/266 |
| 8,915,482 | B2 | * | 12/2014 | Weiß | ................... F16K 31/0655 251/64 |
| 2003/0195082 | A1 | * | 10/2003 | Kalia | ..................... F16H 61/22 477/96 |

(Continued)

*Primary Examiner* — Charles A Fox
*Assistant Examiner* — Gregory T Prather
(74) *Attorney, Agent, or Firm* — Dickinson Wright PLLC

(57) ABSTRACT

A brake transmission shift interlock (BTSI) assembly is provided. The BTSI assembly may include an armature assembly and a flux collector. The armature assembly may include an armature component, a shaft, and a pin. The armature component may include a central through-hole defining a central axis and include a first end defining a first angle surface. The shaft may be disposed within the central through-hole and the pin mounted to the shaft. The flux collector may be mounted to the shaft and includes a second end defining a second angle surface. The armature component and the flux collector may be arranged with one another such that a first plane defined by the first angle surface is substantially parallel to a second plane defined by the second angle surface.

19 Claims, 5 Drawing Sheets

(56) References Cited

U.S. PATENT DOCUMENTS

| | | | | |
|---|---|---|---|---|
| 2011/0290055 A1* | 12/2011 | Hielkema | ............ | F16D 27/118 |
| | | | | 74/473.12 |
| 2011/0290056 A1* | 12/2011 | Garuz Rodes | .......... | F16H 61/22 |
| | | | | 74/473.12 |
| 2012/0268225 A1* | 10/2012 | Mahajan | ............... | H01F 7/1607 |
| | | | | 335/261 |
| 2013/0181151 A1* | 7/2013 | Iwata | .................... | H02K 33/00 |
| | | | | 251/129.15 |
| 2019/0003611 A1* | 1/2019 | Fochtman | .......... | F04B 53/1035 |

\* cited by examiner

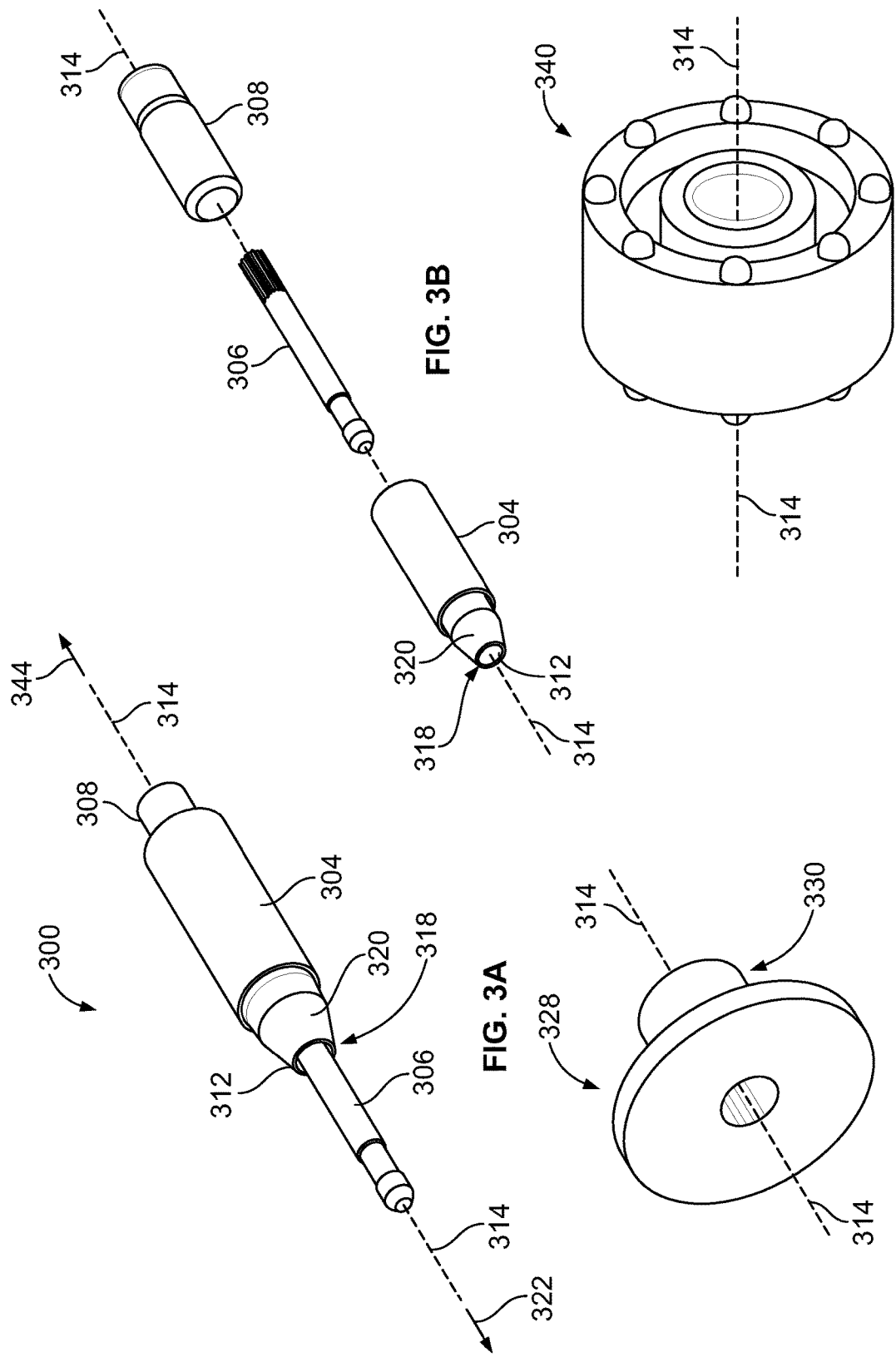

BRAKE TRANSMISSION SHIFT INTERLOCK ASSEMBLY

BACKGROUND

Automotive brake transmission shift interlock (BTSI) solenoids are typically designed to function from 9-16 volts. These BTSI solenoids may be sensitive to functional requirements at high temperatures and/or certain packaging orientations.

SUMMARY

According to an embodiment of the present disclosure, a brake transmission shift interlock (BTSI) assembly is provided. The BTSI assembly includes an armature assembly and a flux collector. The armature assembly includes an armature component, a shaft, and a pin. The armature component includes a central through-hole defining a central axis and includes a first end defining a first angle surface. The shaft is disposed within the central through-hole and the pin mounted to the shaft. The flux collector is mounted to the shaft and includes a second end defining a second angle surface. The armature component and the flux collector are arranged with one another such that a first plane defined by the first angle surface is substantially parallel to a second plane defined by the second angle surface.

According to another embodiment of the present disclosure, a steering assembly is provided. The steering assembly includes an armature assembly, a flux collector, a spring, and a switch assembly. The armature assembly includes an armature component, a shaft, and a pin. The armature component includes a central through-hole defining a central axis and includes a first end defining a first angle surface. The shaft is disposed within the central through-hole and the pin is mounted to the shaft. The flux collector is mounted to the shaft and is disposed thereabout. The flux collector includes a second end defining a second angle surface. The spring is arranged with the armature assembly to bias movement of the armature component, the shaft, and/or the pin in a first direction along the central axis. The switch assembly creates a magnetic field when power is received. The flux collector is arranged with the switch assembly such that the flux collector operates as a magnet responsive to creation of the magnetic field. The flux collector and the spring are arranged with one another such that the flux collector pulls the pin toward the flux collector when a force resulting from the magnetic field is greater than a force of the spring.

According to yet another embodiment of the present disclosure, a steering assembly is provided. The steering assembly includes an armature assembly and a flux collector. The armature assembly includes an armature component, a shaft, and a pin. The armature component includes a central through-hole defining a central axis and includes a first end defining a first angle surface. The shaft is disposed within the central through-hole and the pin is mounted to the shaft to operate as a stopper. The flux collector is disposed about the shaft and the flux collector includes a second end defining a second angle surface. The armature component and the flux collector are each arranged with the shaft such that the first angle surface and the central axis define a first angle between one another substantially equal to between ten and twenty degrees and such that the second angle surface and the central axis define a second angle between one another substantially equal to between ten and twenty degrees.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3A is a perspective view of an example of an armature assembly of a steering assembly;

FIG. 3B is an exploded perspective view of the armature assembly of FIG. 3A;

FIG. 4 is a perspective view of an example of a flux collector of a steering assembly;

FIG. 5 is a perspective view of an example of a damping element of a steering assembly.

DETAILED DESCRIPTION

Figure 1:
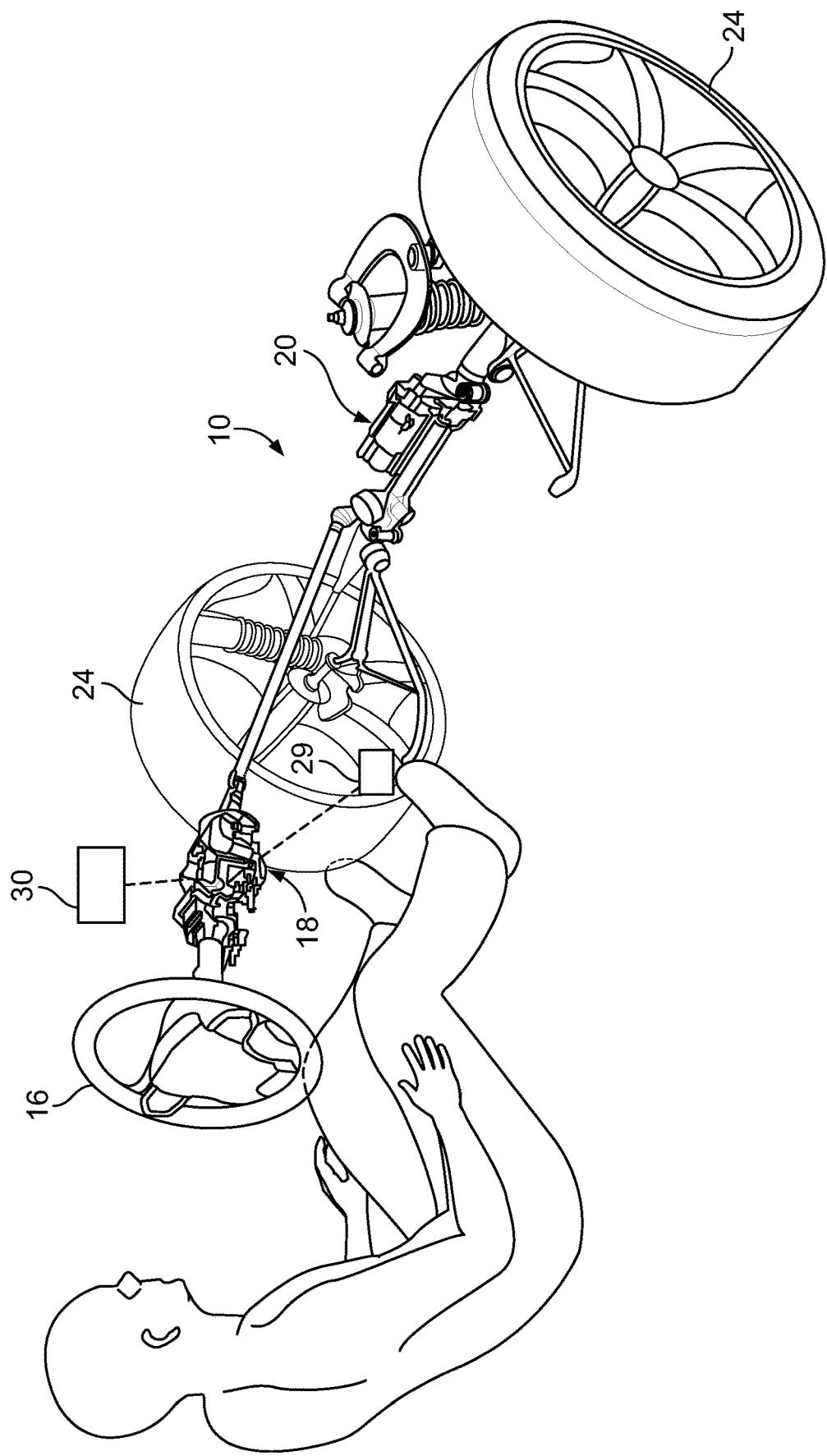
FIG. 1 is a perspective view of an example of a portion of a steering assembly.

Referring now to the Figures, where the invention will be described with reference to specific embodiments, without limiting same, FIG. 1 illustrates an example of a steering assembly for a vehicle, referred to generally as a steering assembly 10 herein. The steering assembly 10 may assist in converting user inputs from a steering wheel 16 to direct movement of the vehicle. It is contemplated that the vehicle may be a car, a truck, a boat, an aircraft, or other similar vehicle without departing from a scope of the present disclosure.

The steering assembly 10 may include the steering wheel 16 secured to an electric power steering assembly 18 for rotation. The electric power steering assembly 18 may be operatively connected to a rack and pinion assembly 20. The steering wheel 16, the electric power steering assembly 18, and the rack and pinion assembly 20 may be arranged with one another to direct movement of a front set of wheels 24 of the vehicle based on a driver's input. For example, the rack and pinion assembly 20 may be operatively connected to each of the front set of wheels 24 via knuckles and tie rods to convey driver input from the steering wheel 16 for movement of each of the front set of wheels 24.

The steering assembly 10 may be in communication with a controller 29. The controller 29 may include programming to direct operation of components of the steering assembly 10 and/or to direct operation of other vehicle components. The programming, for example, may output vehicle operation commands based on received signals or detected vehicle conditions.

Optionally, the steering assembly 10 may be in communication with a self-steering unit 30, such as an advanced driver assistance system or the like. The self-steering unit 30 may include programming to direct movement of the vehicle without driver input to the steering wheel 16.

Figure 2A:
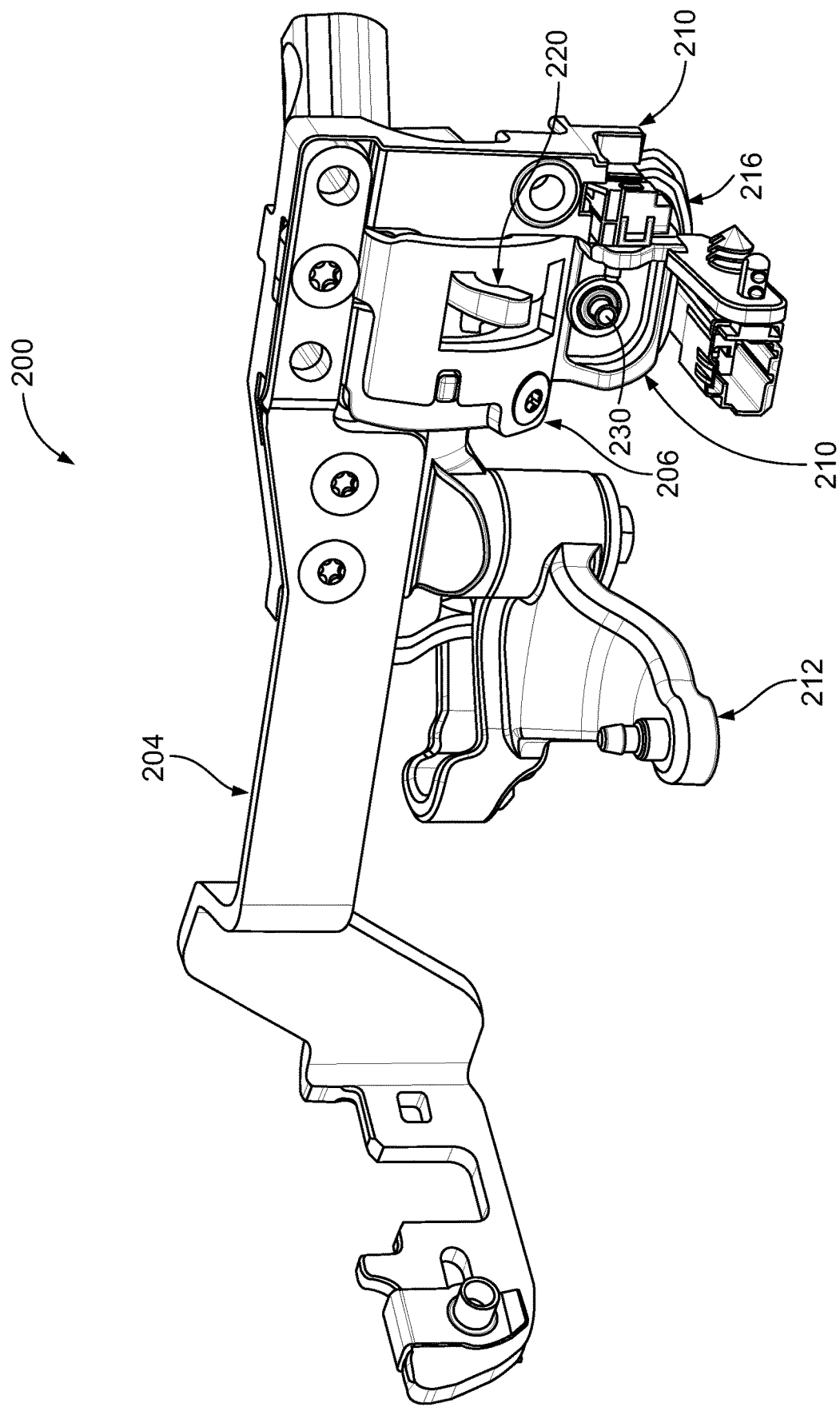
FIG. 2A is a perspective view of an example of a portion of a steering assembly.
Figure 2B:
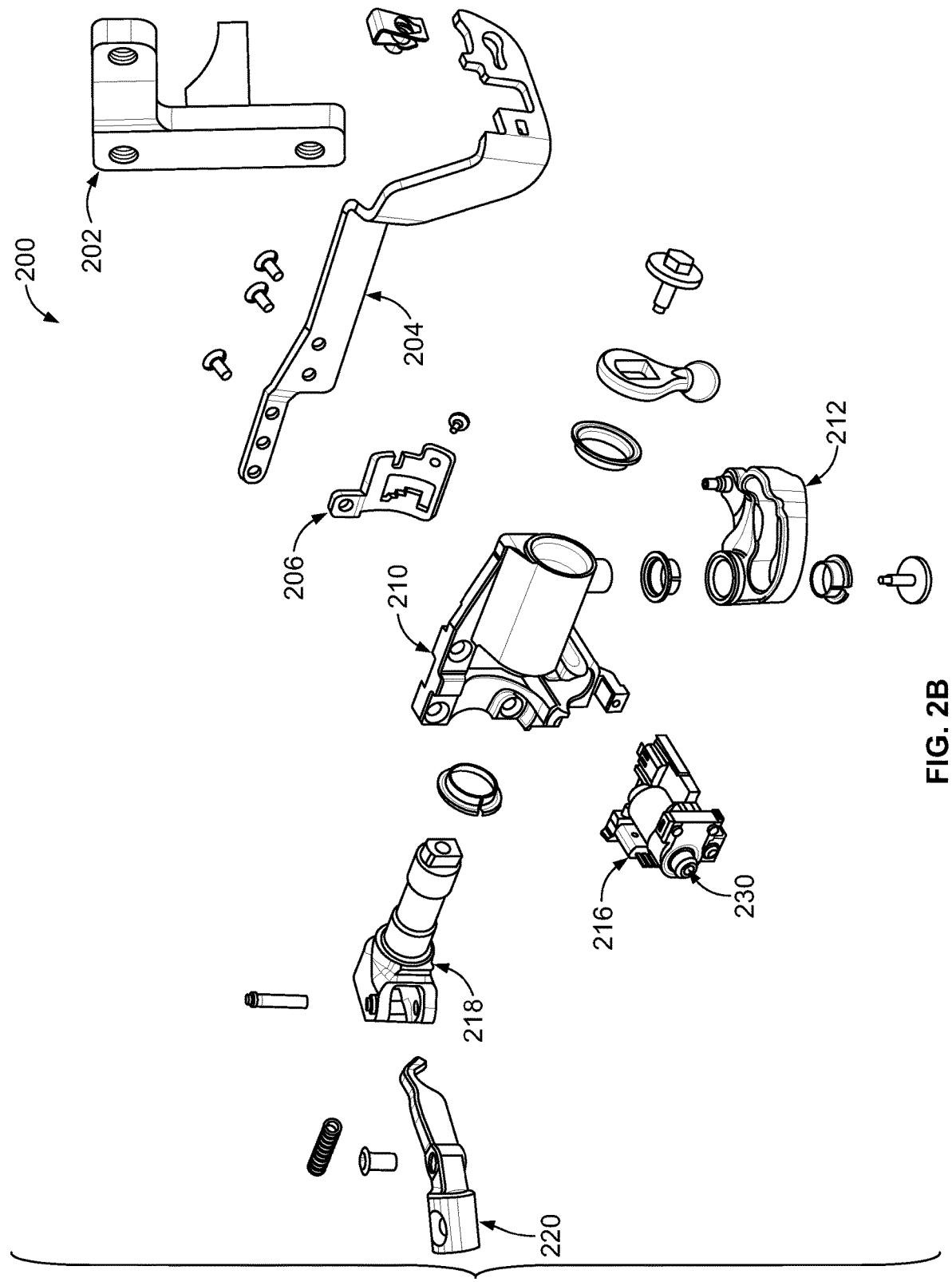
FIG. 2B is a perspective exploded view of the portion of the steering assembly of FIG. 2A.

FIGS. 2A and 2B illustrate an example of a portion of a modular shift assembly, referred to generally as a modular shift assembly 200 herein. The modular shift assembly 200 may be operatively connected to a steering assembly, such as the steering assembly 10, to assist with gear shift operations.

The modular shift assembly 200 may include components such as a mount bracket 202, a cable bracket 204, a shift gate component 206, a shift bracket assembly 210, a cam assembly 212, a brake transmission shift interlock (BTSI) assembly 216, a shaft assembly 218, and a shift clevis 220.

The mount bracket 202 may support the modular shift assembly 200 and be secured to a portion of a steering assembly, such as the steering assembly 10. The mount bracket 202 may be operatively connected to the cable bracket 204 and the shift bracket assembly 210. The shift gate component 206 may include an opening sized for a portion of the shift clevis 220 to extend therethrough. The shift gate component 206 may be operatively connected to the cable bracket 204 and the shift bracket assembly 210. The shift gate component 206 may provide structural reinforcement to the modular shift assembly 200.

The shift bracket assembly 210 may be operatively connected to the cable bracket 204 and/or the mount bracket 202. The cam assembly 212 may be operatively connected to the shift bracket assembly 210. The cam assembly 212 may be arranged within the modular shift assembly 200 to pivot in response to the shift clevis 220 being moved between positions indicative of a state or position of a vehicle transmission. For example, as the shift clevis 220 is moved between a park position and a reverse position, the cam assembly 212 may be pivoted about a portion of the shift bracket assembly 210 to move a portion of a cable or a control mechanism that extends towards the transmission and is operatively connected to a portion of the cable bracket 42.

The BTSI assembly 216 may operate with a brake system of the vehicle to assist in providing safety to a driver during gear shifts. For example, the BTSI assembly 216 may operate to prevent the transmission from being shifted out of a park mode into a drive mode until a brake system operational state is determined. The BTSI assembly 216 may include a pin 230 mounted for translation between at least a retracted position (shown in FIG. 6) and an extended position. When the pin 230 is in the retracted position, the shift clevis 220 may move out of a park position. When the pin 230 is in the extended position, the shift clevis 220 is prevented from moving out of the park position. In one example, the pin 230 may move between the retracted and extended positions responsive to activation of a braking system.

A portion of the shaft assembly 218 may be received within a portion of the shift bracket assembly 210, such as a housing portion defining a cylindrical shape. A portion of the shift clevis 220 may be pivotally connected to the shaft assembly 218.

FIGS. 3A and 3B illustrate an example of an armature assembly for a steering assembly, referred to generally as an armature assembly 300 herein. The armature assembly 300 may be arranged within a vehicle to assist in gear shift operations of the vehicle. The armature assembly 300 may include an armature component 304, a shaft 306, and a pin 308. The armature assembly 300 may include structural elements to house the pin 308 similar to structural elements of the BTSI assembly 216 to house the pin 230 described above.

The armature component 304 defines a central through-hole 312 and central axis 314. The central through-hole 312 extends a length of the armature component 304. The armature component 304 includes a first end 318 that may define an armature angle surface 320. Various angle values are available for the armature angle surface 320 relative to the central axis 314. In one example, an angle value for the armature angle surface 320 relative to the central axis 314 may be substantially equal to fifteen degrees or substantially equal to between ten and twenty degrees. The armature angle surface 320 may be structured such that the first end 318 defines a cone-like shape.

The shaft 306 may be sized for disposal within the central through-hole 312 such that the shaft 306 extends along the central axis 314 for rotation thereabout. The pin 308 may be arranged with the armature component 304 to operate as a stopper and constrain movement of the shaft 306 relative the central axis 314 in a first direction along the central axis 314. The first direction is represented by arrow 322 (arrow 322 shown in FIGS. 3A and 6). In one example, the pin 308 may be joined to the armature component 304 such that the pin 308 and the armature component 304 translate with one another. Additionally, the armature component 304 may be joined to the shaft 306 such that the armature component, the shaft 306, and the pin 308 translate with one another along the central axis 314.

FIG. 4 illustrates an example of a flux collector 328 for mounting adjacent the shaft 306 about the central axis 314 and such that flux collector 328 and the shaft 306 do not contact one another. In one example, a bushing may orient the shaft 306 to provide clearance for the flux collector 328. The flux collector 328 may also be referred to as a core and may operate to assist in managing magnetic fields of the armature assembly 300. For example, when power is supplied to a switch assembly of the armature assembly 300, current is generated and creates a magnetic field that "collects" within and magnetizes the flux collector 328 such that the flux collector 328 may operate as a magnet. Based on an electromagnetic charge, the pin 308 may be pulled toward the flux collector 328 and held in a retracted position until power is removed from the switch assembly.

Figure 6:
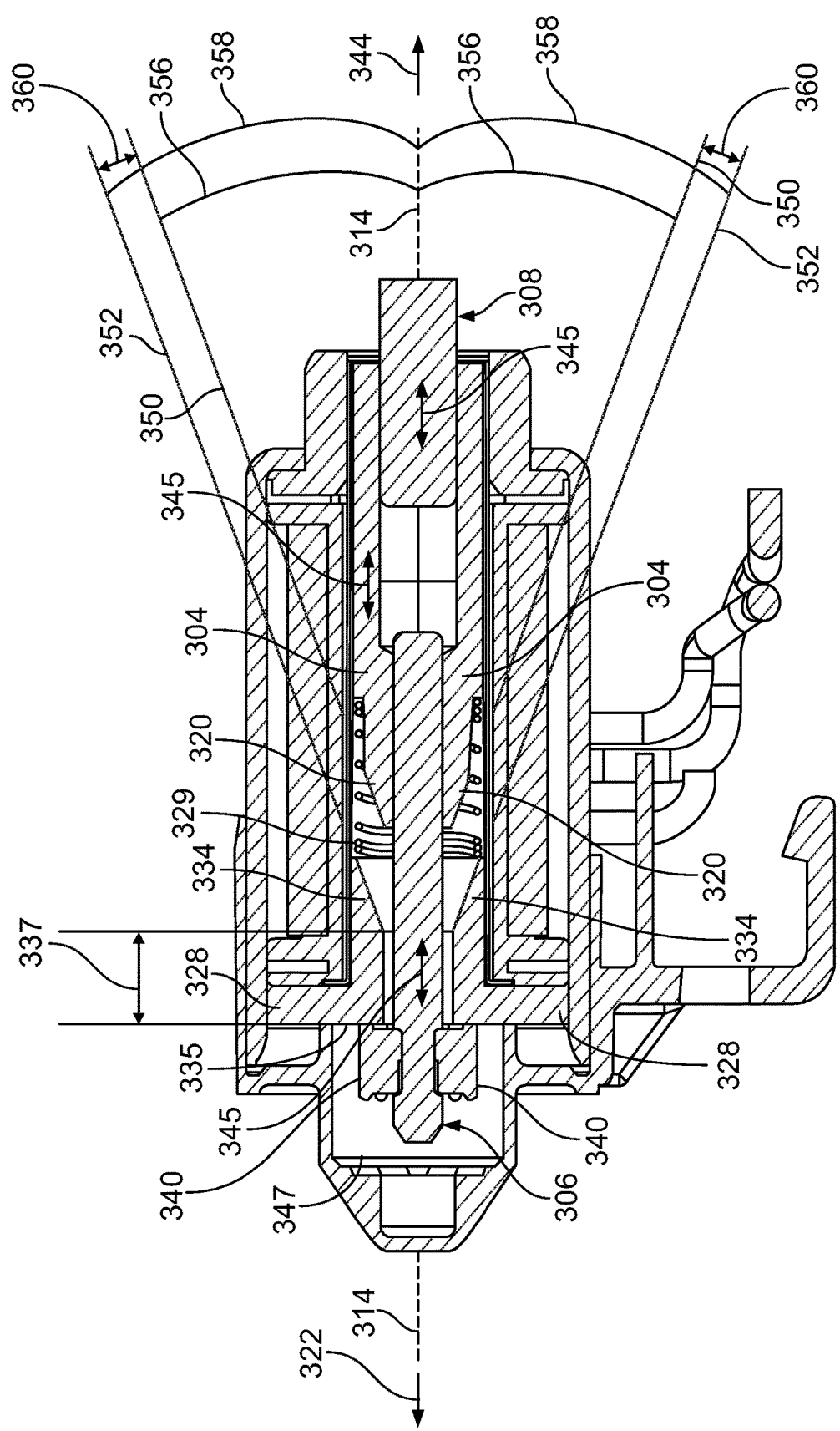
FIG. 6 is a side view, in cross-section, of an example of a portion of an armature assembly of a steering assembly.

Once the power is removed, the electromagnetic charge may be discharged and the pin 308 may be returned to an extended position via, for example, a bias of a spring 329 (shown in FIG. 6). The spring 329 may be arranged with the armature component 304, the shaft 306, and/or the pin 308 to bias movement in the direction represented by arrow 344. A force required to pull the pin 308 enough to shift out of a park gear position may be referred to as a pull-in force.

The flux collector 328 may include a first end 330 defining a flux angle surface 334 (flux angle surface 334 not visible in FIG. 4). A base of the flux angle surface 334 may be spaced from a base 335 of the flux collector 328 a length 337. The length 337 may be substantially equal to 4.9 millimeters. Various angle values are available for the flux angle surface 334 relative to the central axis 314. In one example, the armature angle surface 320 and the flux angle surface 334 are each formed to define an angle relative to the central axis 314 substantially equal to one another. In this example, the armature angle surface 320 and the flux angle surface 334 are each formed to define an angle substantially equal to fifteen degrees or substantially equal to between ten and twenty degrees relative to the central axis 314.

FIG. 5 illustrates an example of a damper element 340 for mounting to the shaft 306 about the central axis 314. The damper element 340 may also be referred to as a bushing. The damper element 340 may define a doughnut shape and may be located upon the shaft 306 to operate as a stopper and to constrain movement of the shaft 306 in the first direction (as represented by arrow 322 in FIGS. 3A and 6) and in a second direction (as represented by arrow 344 in FIGS. 3A and 6). For example, the damper element 340 may be secured to the shaft 306 such that the damper element 340 constrains movement of the shaft 306 based on damper element 340 contact with the flux collector 328 and an internal housing surface 347. As such, the pin 308 and the damper element 340 may be arranged with the shaft 306 to constrain movement of the shaft 306 along the central axis 314.

FIG. 6 is a side view, in cross-section, of a portion of a steering assembly or a BTSI assembly including the armature assembly 300 described above. FIG. 6 illustrates further detail on a structural relationship between components of the armature assembly 300 and other vehicle components located adjacent thereto. For example, the shaft 306 is shown extending through through-holes of the armature component 304, the flux collector 328, and the damper element 340. Arrows 345 represent directional movement of the armature component 304, shaft 306, and the pin 308 along the central axis 314.

The flux collector 328 and the armature component 304 may be arranged with one another such that a plane defined by the armature angle surface 320 is parallel to another plane defined by the flux angle surface 334. For example, the armature angle surface 320 may define a first plane 350 and the flux angle surface 334 may define a second plane 352 oriented parallel to the first plane 350. This parallel relationship eliminates a potential for issues to arise as a result of contact or interference between the armature angle surface 320 and the flux angle surface 334.

The first plane 350 may be oriented at an angle 356 relative to the central axis 314. The second plane 352 may be oriented at an angle 358 relative to the central axis 314. Each of the angles 356 and each of the angles 358 may be substantially equal to fifteen degrees or substantially equal to between ten and twenty degrees. Each of the first planes 350 is spaced a length 360 from a respective second plane 352. The length 360 is reflective of an air gap maintained between the armature angle surface 320 and the flux angle surface 334. In one example, the length 360 may be substantially equal to 1.37 millimeters.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A brake transmission shift interlock assembly comprising:
    an armature assembly including an armature component, a shaft, and a pin, the armature component including a central through-hole defining a central axis extending between a first end and a second end of the armature component, with the first end defining a first angle surface, the shaft disposed through the first end and fixed within the central through-hole and extending along the central axis outwardly from the first end, the pin mounted to the armature component and extending along the central axis away from the second end of the armature component;
    a flux collector mounted about the shaft in clearance relation with the shaft, the flux collector including a second end defining a second angle surface, the armature component and the flux collector being arranged with one another such that a first plane tangent to the first angle surface is parallel to a second plane tangent to the second angle surface, and
    a damper element fixed to the shaft, the damper element being arranged to move from spaced relation from the flux collector into contact with the flux collector to constrain shaft movement along the central axis in a first direction toward the pin.

2. The assembly of claim 1 further comprising:
    a spring arranged with the armature assembly to bias movement of the armature component, the shaft, and the pin in the first direction along the central axis; and
    the flux collector operating as a magnet responsive to creation of a magnetic field, such that the flux collector pulls the pin toward the flux collector when a force resulting from the magnetic field is greater than a force of the spring.

3. The assembly of claim 1, wherein the flux collector further includes a base, the second angle surface being spaced from the base a length equal to 4.9 mm.

4. The assembly of claim 1, wherein the damper element, the armature assembly and the flux collector are disposed within a housing defining an internal surface, the damper element and the flux collector being arranged with one another such that the damper element is fixed to the shaft between a base portion of the flux collector facing away from the armature component and the internal surface of the housing.

5. The assembly of claim 1, wherein the first plane and the central axis define an angle equal to fifteen degrees.

6. The assembly of claim 1, wherein the armature component and the flux collector are each arranged with the shaft such that the first angle surface and the central axis define a first angle between one another equal to between ten and twenty degrees and such that the second angle surface and the central axis define a second angle between one another equal to between ten and twenty degrees.

7. A brake transmission shift interlock assembly comprising:
    an armature assembly including an armature component, a shaft, and a pin, the armature component defining a central axis and including a first end defining a first angle surface, the shaft fixed to the armature component and extending along the central axis and the pin mounted to the armature component and extending along the central axis;
    a flux collector mounted about the shaft in clearance relation thereabout, the flux collector including a second end defining a second angle surface;
    a spring arranged with the armature assembly to bias movement of the armature component, the shaft, and the pin in a first direction along the central axis, wherein the armature component and the shaft are biased toward the pin, the spring extending between opposite ends and engaging the armature component with one of the opposite ends and engaging the flux collector with the other of the opposite ends, wherein the spring is constantly compressed between the armature component and the flux collector; and
    the flux collector operating as a magnet responsive to creation of a magnetic field, and the flux collector pulls the armature component, the shaft, and the pin against the bias of the spring in a second direction toward the flux collector when a force resulting from the magnetic field is greater than a force of the spring.

8. The assembly of claim 7 further comprising a damper element mounted to the shaft, the damper element and the flux collector being arranged to move from disengaged relation from the flux collector into engaged relation with the flux collector such that the damper element constrains movement of the shaft in the first direction along the central axis.

9. The assembly of claim 8 further comprising a housing, the armature assembly and the flux collector being disposed within the housing and the housing defines an internal surface, the damper element, the internal surface, and the flux collector being arranged such that the dampener element is mounted to the shaft between a base portion of the flux collector facing away from the pin and the internal surface of the housing in the first direction and in the second direction, opposite the first direction, along the central axis.

10. The assembly of claim 7, wherein the flux collector further includes a base, the second angle surface being spaced from the base a length equal to 4.9 millimeters.

11. The assembly of claim 7, wherein the armature component and the flux collector are arranged with one another such that a first plane tangent to the first angle surface is parallel to a second plane tangent to the second angle surface.

12. The assembly of claim 7, wherein the armature component and the flux collector are each arranged with the shaft such that the first angle surface and the central axis define a first angle between one another equal to between ten and twenty degrees and such that the second angle surface and the central axis define a second angle between one another equal to between ten and twenty degrees.

13. The assembly of claim 12, wherein the armature component and the flux collector are each further arranged with the shaft such that the first angle surface and the central axis define a first angle between one another equal to fifteen degrees and such that the second angle surface and the central axis define a second angle between one another equal to fifteen degrees.

14. A steering assembly comprising:
an armature assembly including an armature component, a shaft, and a pin, the armature component including a central through-hole defining a central axis and including a first end defining a first angle surface, the shaft disposed and fixed within the central through-hole, the pin mounted to the armature component to operate as a stopper, wherein the armature component, the shaft, and the pin are configured to translate in fixed relation with one another along the central axis;
a flux collector disposed about the shaft, the flux collector including a second end defining a second angle surface, the armature component and the flux collector are each arranged with the shaft such that the first angle surface and the central axis define a first angle between one another equal to between ten and twenty degrees and such that the second angle surface and the central axis define a second angle between one another equal to between ten and twenty degrees; and
a spring having a one end engaging the armature component and an opposite end engaging the flux collector, wherein the spring is constantly compressed between the armature component and the flux collector to bias the armature component toward the pin.

15. The assembly of claim 14, wherein the armature assembly and the flux collector are arranged with one another such that a plane tangent to the first angle surface is parallel to another plane tangent to the second angle surface.

16. The assembly of claim 14 further comprising a damper element mounted to the shaft, the damper element and the flux collector being arranged with one another such that the damper element constrains movement of the shaft in a first direction.

17. The assembly of claim 16, wherein the armature assembly and the flux collector are disposed within a housing defining an internal surface, the damper element, the internal surface, and the flux collector being arranged with one another such that the damper element is mounted to the shaft for engagement with a base of the flux collector facing away from the pin.

18. The assembly of claim 14, wherein the second angle surface is spaced from the base a length equal to 4.9 millimeters.

19. The assembly of claim 14, wherein the flux collector operates as a magnet responsive to creation of a magnetic field, such that the flux collector pulls the pin toward the flux collector when a force resulting from the magnetic field is greater than a force of the spring.

* * * * *